(12) United States Patent
Valentine

(10) Patent No.: US 9,419,421 B1
(45) Date of Patent: Aug. 16, 2016

(54) SCREW EXTENDER

(71) Applicant: Jim Valentine, Dallas, TX (US)

(72) Inventor: Jim Valentine, Dallas, TX (US)

( * ) Notice: Subject to any disclaimer, the term of this patent is extended or adjusted under 35 U.S.C. 154(b) by 0 days.

(21) Appl. No.: 15/014,745

(22) Filed: Feb. 3, 2016

Related U.S. Application Data

(63) Continuation-in-part of application No. 14/726,259, filed on May 29, 2015, now abandoned, which is a continuation of application No. 14/297,823, filed on Jun. 6, 2014, now Pat. No. 9,048,648.

(60) Provisional application No. 61/949,718, filed on Mar. 7, 2014, provisional application No. 61/895,280, filed on Oct. 24, 2013.

(51) Int. Cl.
*H02G 3/14* (2006.01)
*F16B 5/02* (2006.01)
*H02G 3/12* (2006.01)

(52) U.S. Cl.
CPC .. *H02G 3/14* (2013.01); *F16B 5/02* (2013.01); *H02G 3/12* (2013.01)

(58) Field of Classification Search
USPC .......................................................... 174/502
See application file for complete search history.

(56) References Cited

U.S. PATENT DOCUMENTS

| | | |
|---|---|---|
| 793,399 A | 6/1905 | Schultz |
| 867,624 A | 10/1907 | Warthen |
| 937,577 A | 10/1909 | Crump |
| 1,078,007 A | 11/1913 | Stange |
| 1,988,813 A | 1/1935 | Seguin |
| 2,485,280 A | 10/1949 | Grace |
| 3,563,131 A | 2/1971 | Ridley, Sr. |
| 4,111,568 A | 9/1978 | Wing |
| 4,635,337 A | 1/1987 | Helderman |
| 4,784,554 A | 11/1988 | Break |
| 5,030,052 A | 7/1991 | Anderson et al. |
| 5,860,548 A | 1/1999 | Kerr, Jr. |
| 5,907,124 A | 5/1999 | Reiker |
| 5,965,845 A | 10/1999 | Reiker |
| 6,096,974 A | 8/2000 | Reiker |
| 6,204,450 B1 | 3/2001 | Reiker |
| 6,207,898 B1 | 3/2001 | Reiker |
| 6,207,989 B1 | 3/2001 | Li et al. |
| 6,291,768 B1 | 9/2001 | Reiker |
| 6,303,859 B1 | 10/2001 | Reiker |
| 6,423,899 B1 | 7/2002 | Reiker |
| 6,811,364 B2 | 11/2004 | Kelzer |
| 6,910,826 B1 | 6/2005 | Damiano |
| 7,105,742 B1 | 9/2006 | Jolly |
| 7,985,041 B2 | 7/2011 | Lin |
| 8,109,785 B2 | 2/2012 | Kidman |
| 2002/0197132 A1 | 12/2002 | Cruz et al. |
| 2004/0057811 A1 | 3/2004 | Kelzer |
| 2006/0036259 A1 | 2/2006 | Carl et al. |
| 2010/0086378 A1 | 4/2010 | Lin |
| 2013/0215381 A1 | 8/2013 | Raghuprasad |
| 2014/0102745 A1 | 4/2014 | Gomez |

*Primary Examiner* — Dhirubhai R Patel

(74) *Attorney, Agent, or Firm* — Jack D. Stone, Jr.; Scheef & Stone, L.L.P.

(57) ABSTRACT

An apparatus for facilitating using a screw to secure a receptacle cover plate over a junction box recessed in a wall, the junction box including at least one tapped screw receiver, and the cover plate defining at least one hole corresponding to the at least one tapped screw receiver. A bushing is provided with internal (female) threads at a first end. At a second end of the bushing is provided either external (male) threads, or internal threads into which a stud is engaged having external threads. The external threads engage the at least one tapped screw receiver. The at least one screw extends through the at least one hole defined in the cover plate to threadingly engage the internal threads of the bushing, thereby securing the cover plate to the junction box.

21 Claims, 8 Drawing Sheets

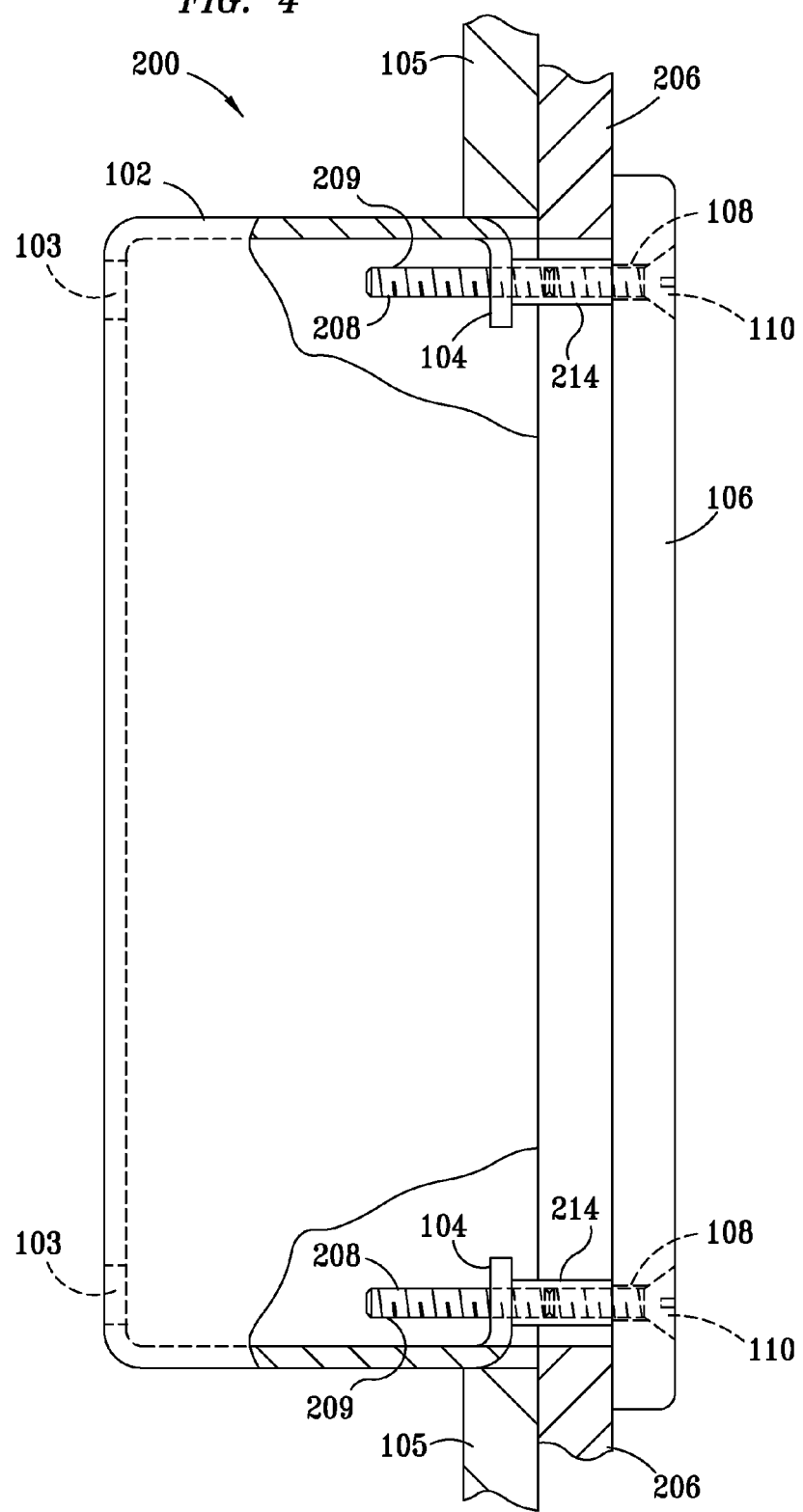

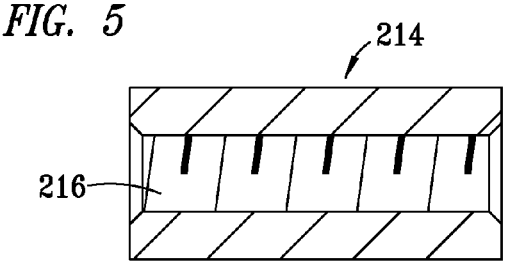
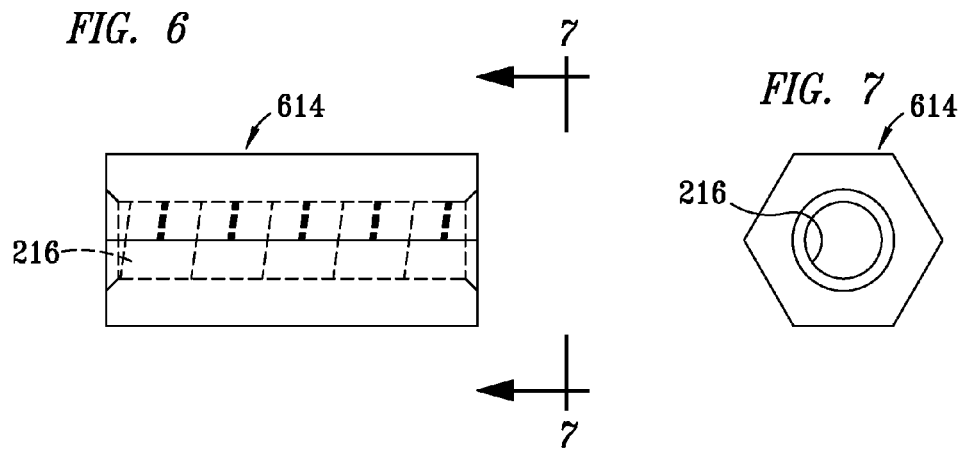
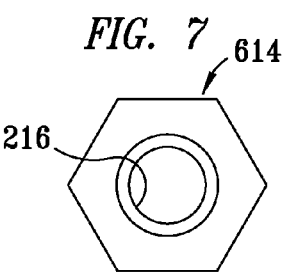
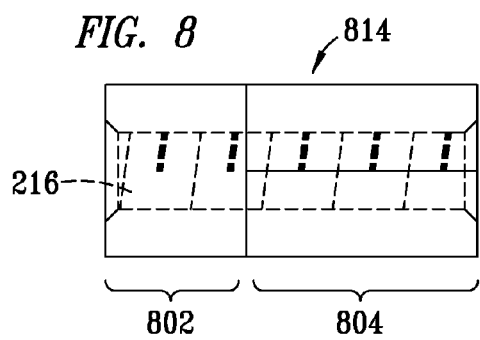
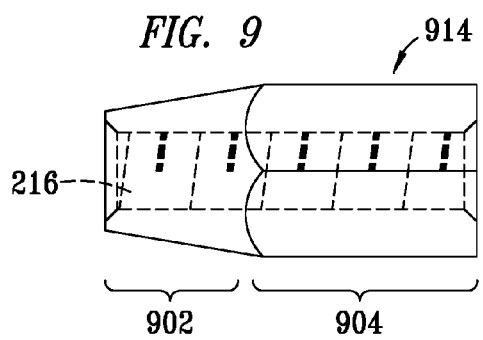

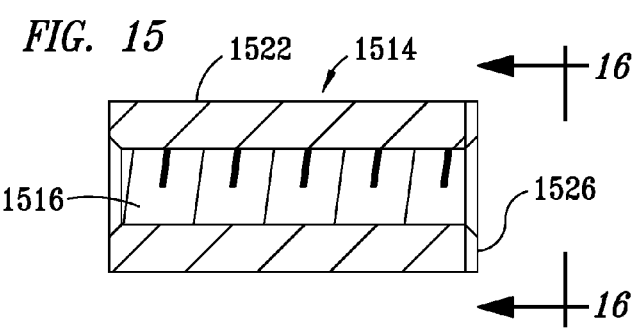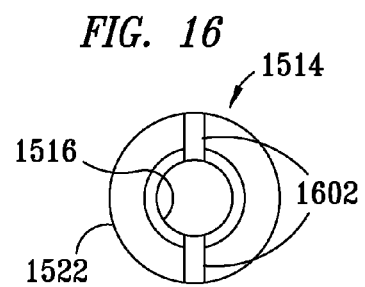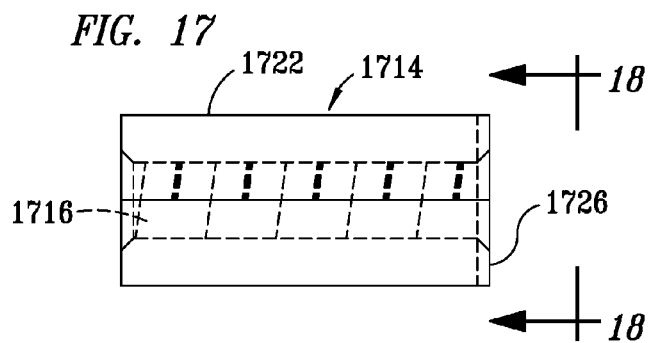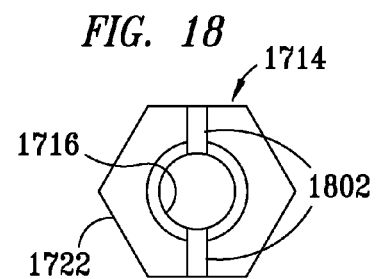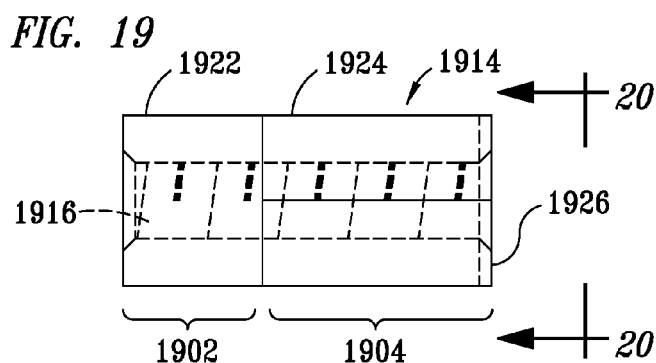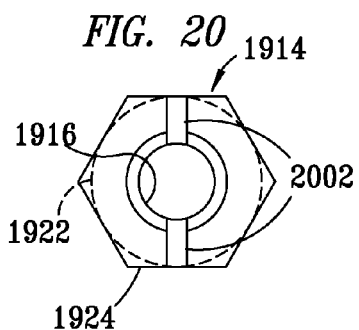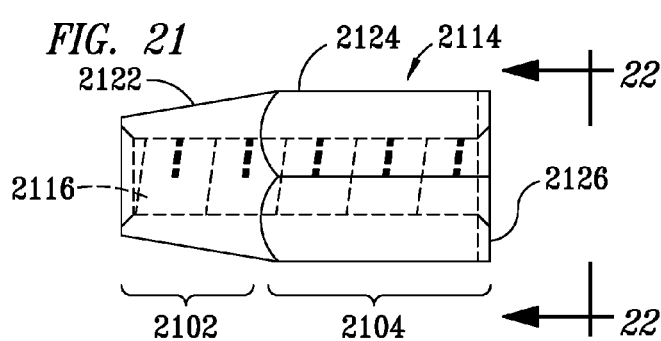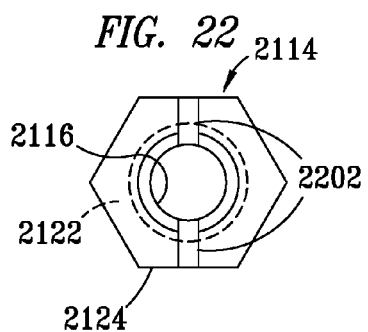

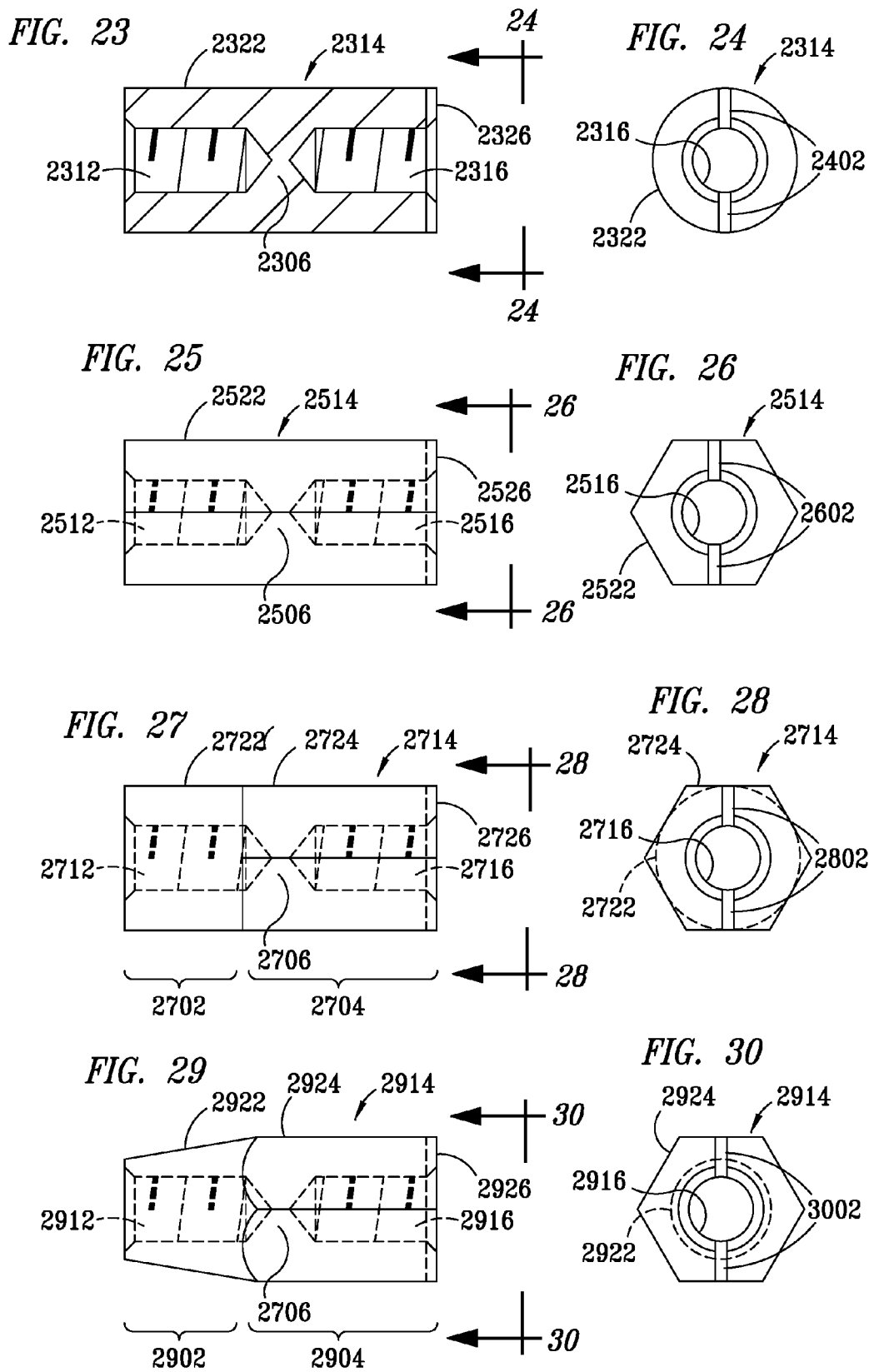

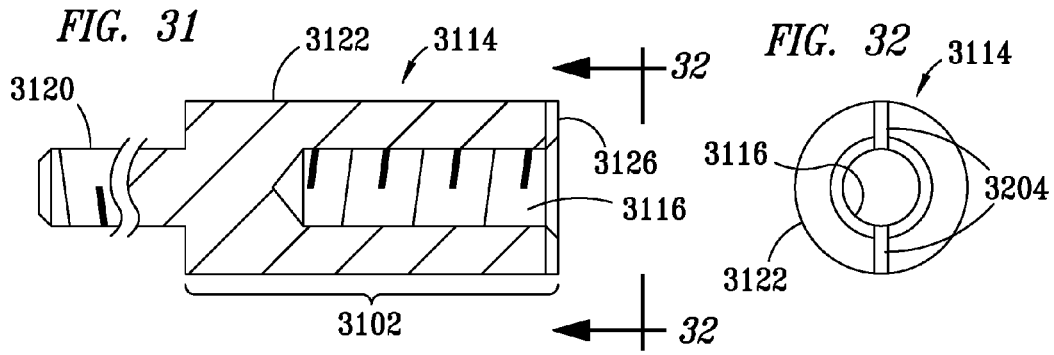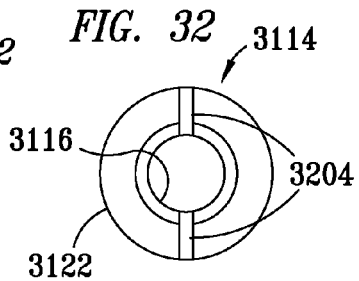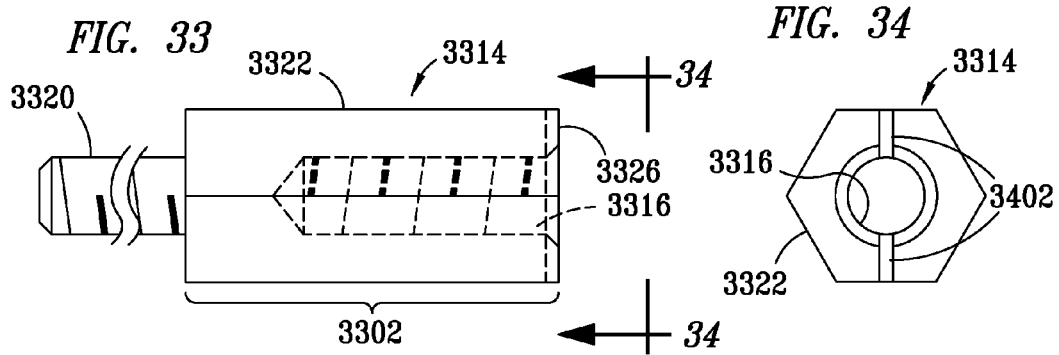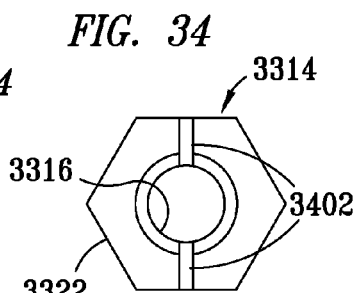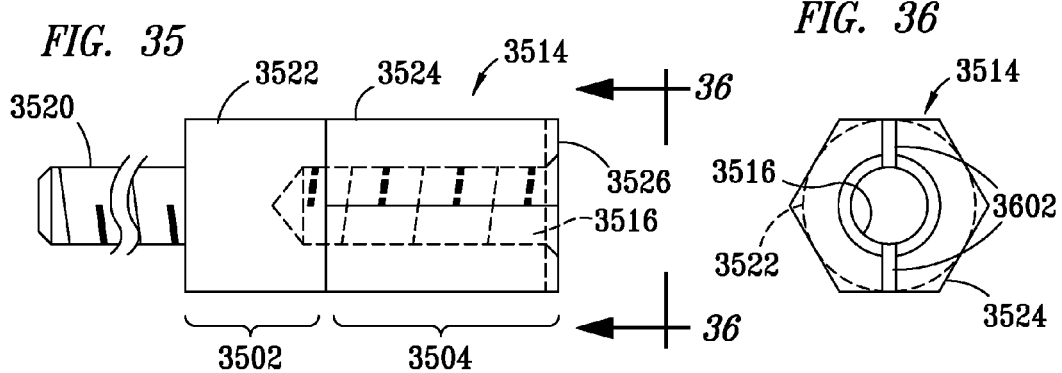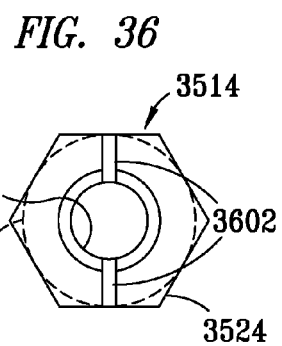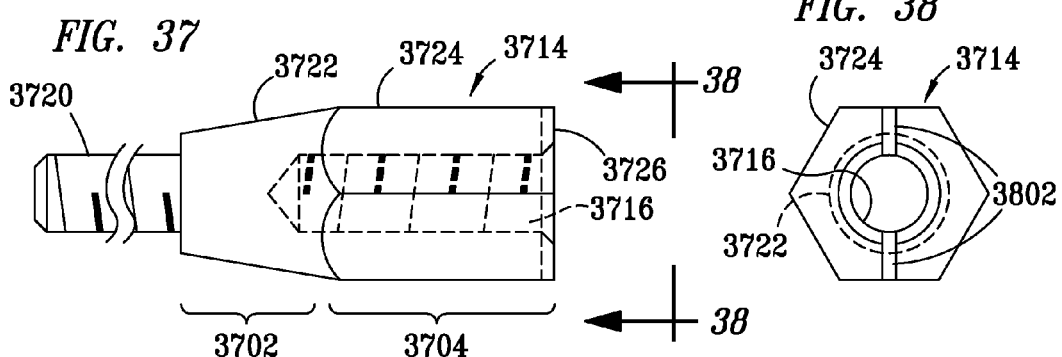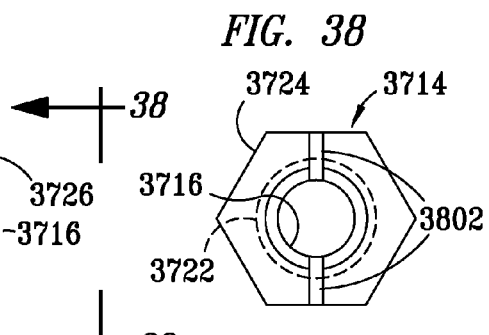

SCREW EXTENDER

CROSS-REFERENCE TO RELATED APPLICATIONS

This application is a continuation-in-part of patent application Ser. No. 14/726,259, filed on May 29, 2015, now abandoned which is a continuation of U.S. Pat. No. 9,048,648, formerly co-pending patent application Ser. No. 14/297,823, filed on Jun. 6, 2014, and issued on Jun. 2, 2015, which claims the benefit of U.S. Provisional Application No. 61/895,280, filed Oct. 24, 2013, and U.S. Provisional Application No. 61/949,718, filed Mar. 7, 2014, all of which applications are hereby incorporated herein by reference, in their entirety.

TECHNICAL FIELD

The invention relates generally to junction boxes and, more particularly, to a method and an apparatus for attaching a plate, such as a cover plate, to a recessed junction box.

BACKGROUND

With reference to FIG. 1, showing the prior art, a junction box (including electric boxes) assembly 100 includes a junction box 102 positioned within the wall 105 so that it is generally flush with the outside of the wall 105. The box 102 is exemplified with two tapped screw receivers 104, though it could be configured with one or more than two tapped screw receivers. A cover plate 108 is positioned over the junction box 102 such that holes 106 defined in the plate 108 correspond with and are aligned with the tapped screw receivers 104 on the junction box. Screws 110 are then inserted through the holes 106 of the cover plate 108 and into the tapped screw receivers 104 of the junction box 102 to thereby secure the cover plate 108 to the junction box. While the cover plate 108 is shown as a blank, it may be configured in any of a number of different ways suitable for serving the function intended for the junction box 102, such as an electric junction box, switchbox, coax cable box, audio box, telephone jack box, or the like.

While a cover plate 108 may be readily secured to a junction box 102 in a situation such as depicted in FIG. 1 wherein the junction box is generally flush with the outside of the wall 105, it is common for the wall 105 to be subsequently resurfaced with ceramic tile, granite, or the like that is thicker than the original tile or granite, or for ceramic tile, granite, or the like to be laid on top of the existing wall, or for ceiling fans to be installed with extended housings, all of which result in the junction box being recessed into the wall, perhaps as much as two inches into the wall. In such cases, the function box 102 then becomes recessed within the wall 105 instead of flush with the outside of the wall. When that occurs, the screws 110 that are included with the cover plate are typically not long enough to extend through the holes 106 into the tapped screw receivers 104 to thereby secure the cover plate 108 to the junction box 102. One solution to such a dilemma is to use longer screws that will extend the additional length needed to engage the threaded holes 104 from the cover plate. There are two problems with that, though. First, longer screws are typically not readily available without visiting a hardware store. Second, if such screws are obtained, then, because of the additional distance that the screw has to travel, it is difficult to align the screw 110 with the tapped screw receivers 104.

Therefore, what is needed is a method and apparatus for enabling cover plates to be readily secured to recessed junction boxes.

SUMMARY

The present invention, accordingly, provides an apparatus for facilitating using at least one screw to secure a receptacle cover plate to a junction box recessed in a wall, wherein the junction box includes at least one tapped screw receiver, and the cover plate defines at least one hole corresponding to the at least one tapped screw receiver. The apparatus includes a bushing is provided with internal (female) threads at a first end. At a second end of the bushing is provided either external (male) threads, or internal threads into which a stud is engaged having external threads. The external threads engage the at least one tapped screw receiver. The at least one screw extends through the at least one hole defined in the cover plate to threadingly engage the internal threads of the bushing, thereby securing the cover plate to the junction box.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 exemplifies the cover plate of FIG. 2 secured to the junction box of FIG. 2 in accordance with principles of the present invention;

FIG. 5 is a cross-section of the bushing of FIGS. 2-4;

FIG. 6 is a side view of an alternative embodiment of the bushing of FIGS. 2-5;

FIG. 7 is an end view of the bushing of FIG. 6 taken along view line 7-7;

FIG. 8 is a side view of an alternative embodiment of the bushings of FIGS. 2-7;

FIG. 9 is a side view of an alternative embodiment of the bushings of FIGS. 2-8;

FIG. 15 is a cross-sectional side view of an alternative embodiment of the bushing of FIG. 5;

FIG. 16 is an end view of the bushing of FIG. 15 taken along the line 16-16 of FIG. 15;

FIG. 17 is a side view of an alternative embodiment of the bushing of FIG. 6;

FIG. 18 is an end view of the bushing of FIG. 17 taken along the line 18-18 of FIG. 17;

FIG. 19 is a side view of an alternative embodiment of the bushing of FIG. 8;

FIG. 20 is an end view of the bushing of FIG. 19 taken along the line 20-20 of FIG. 19;

FIG. 21 is a side view of an alternative embodiment of the bushing of FIG. 9;

FIG. 22 is an end view of the bushing of FIG. 21 taken along the line 22-22 of FIG. 21;

FIG. 23 is a cross-sectional side view of an alternative embodiment of the bushing of FIG. 10;

FIG. 24 is an end view of the bushing of FIG. 23 taken along the line 24-24 of FIG. 23;

FIG. 25 is a side view of an alternative embodiment of the bushing of FIG. 11;

FIG. 26 is an end view of the bushing of FIG. 25 taken along the line 26-26 of FIG. 25;

FIG. 27 is a side view of an alternative embodiment of the bushing of FIG. 13;

FIG. 28 is an end view of the bushing of FIG. 27 taken along the line 28-28 of FIG. 27;

FIG. 29 is a side view of an alternative embodiment of the bushing of FIG. 14;

FIG. 30 is an end view of the bushing of FIG. 29 taken along the line 30-30 of FIG. 29;

FIG. 31 is a side view of an alternative embodiment of the bushing of FIG. 15;

FIG. 32 is an end view of the bushing of FIG. 31 taken along the line 32-32 of FIG. 31;

FIG. 33 is a side view of an alternative embodiment of the bushing of FIG. 17;

FIG. 34 is an end view of the bushing of FIG. 33 taken along the line 34-34 of FIG. 33;

FIG. 35 is a side view of an alternative embodiment of the bushing of FIG. 19;

FIG. 36 is an end view of the bushing of FIG. 35 taken along the line 36-36 of FIG. 35;

FIG. 37 is a side view of an alternative embodiment of the bushing of FIG. 21; and FIG. 38 is an end view of the bushing of FIG. 37 taken along the line 38-38 of FIG. 37.

DETAILED DESCRIPTION

Figure 1:
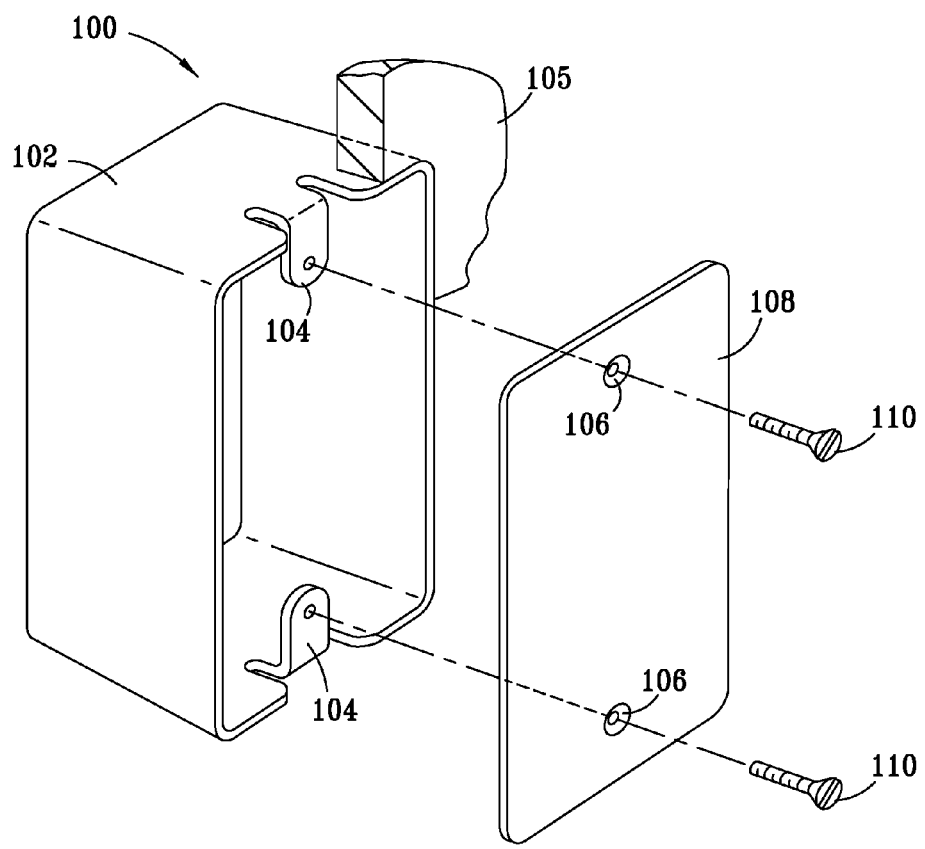
FIG. 1 is a perspective view of a junction box and cover plate embodying features of the prior art.

In the following discussion of the figures, the same reference numerals will be used throughout to refer to the same or similar components. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

Figure 2:
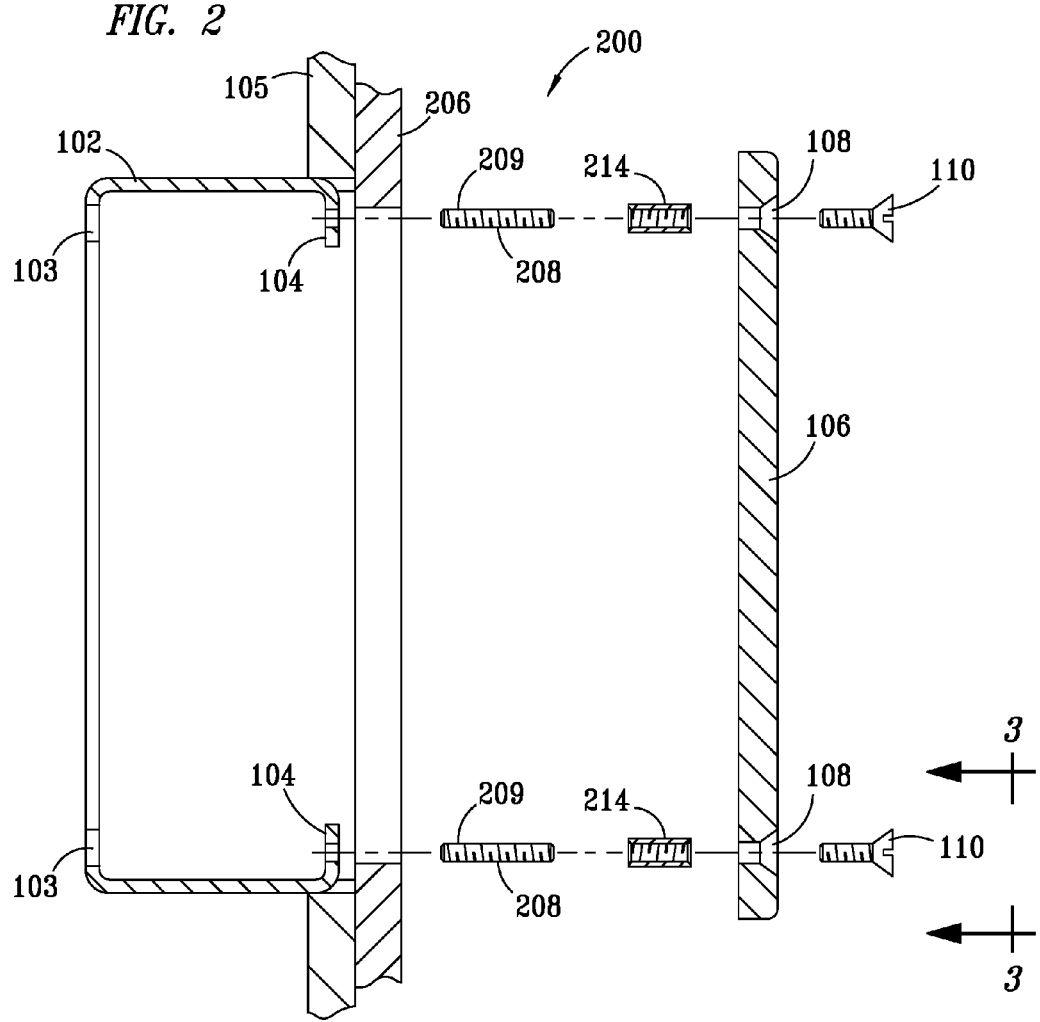
FIG. 2 is a partially exploded side view exemplifying a junction box recessed within a wall and a cover plate to be secured to the junction box in accordance with principles of the present invention.

Referring to FIG. 2 of the drawings, the reference numeral 200 generally designates a junction box assembly embodying features of the present invention. The assembly 200 includes the junction box 102 secured to the wall 105. The junction box 102 further includes the tapped screw receivers 104 and, optionally, defines holes 103 aligned with the tapped screw receivers 104 for allowing long screws 110 to extend through. As shown in FIG. 2, the wall 105 has been overlaid with a façade such as a layer of ceramic tile, granite, or the like 206. As a result, the screw 110 will not reach the tapped screw receivers 104 from the cover plate 106. However, in accordance with principles of the present invention, each tapped screw receiver 104 is provided with at least one threaded stud (aka, a headless screw or blind screw) 208 having, as shown more clearly in cross-section in FIG. 5, a threaded bushing 214 (having a length equal to or less than the thickness of the façade 206) having threads 216 for securing one end of the stud 208 to the bushing, and each stud 208 is screwed into a respective tapped screw receiver 104. With each threaded bushing 214 secured to a respective stud 208, and each stud 208 secured to a respective tapped screw receiver 104, the cover plate 106 may be positioned over the junction box 102 and the screws 110 may be inserted through the holes 108 into respective threaded bushing 214 to thereby secure the cover 106 to the junction box 102, as depicted by FIG. 4.

In one preferred embodiment of the invention, the stud 208 is also provided with a light coat of lacquer 209, or the like, effective for creating friction or resistance to movement, so that when the threaded bushing 214 is screwed to the end of the stud 208, and the stud 208 is screwed into the tapped screw receiver 104, there will be resistance to the threaded bushing 214 unscrewing from the stud 208 or the stud 208 unscrewing from the tapped screw receiver 104, so that the screws 110 may be more securely screwed into respective threaded bushings 214, to thereby secure the cover plate 106 to the junction box 102.

In an alternate preferred embodiment of the invention, the threaded bushing 214 is permanently secured to the stud 208 by means of a bonding agent, such as epoxy, a tack weld, or the like.

Figure 3:
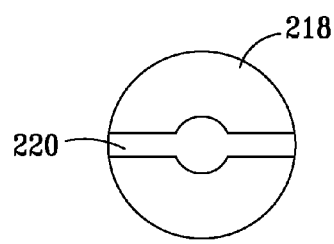
FIG. 3 exemplifies the head of the screw in one embodiment of the present invention.
Figure 10:
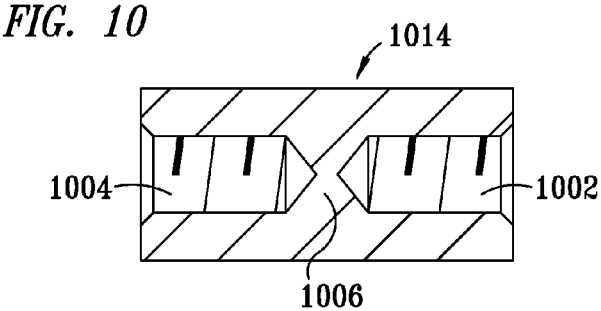
FIG. 10 is a cross-section of an alternate embodiment of the bushing of FIG. 5.
Figure 11:
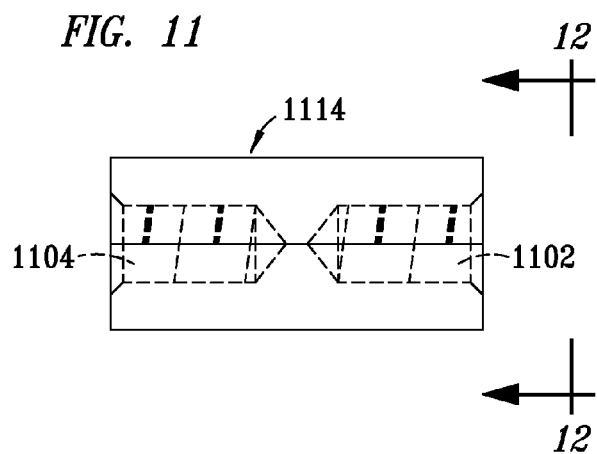
FIGS. 11 and 12 are respective side and end views of an alternative embodiment of the bushing of FIGS. 6 and 7.
Figure 12:
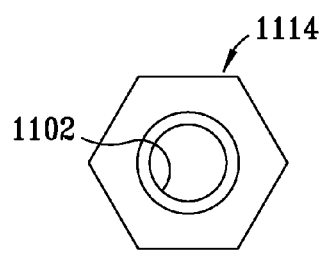
Figure 13:
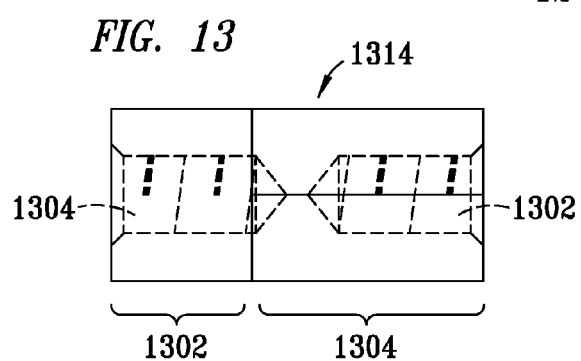
FIG. 13 is a side view of an alternative embodiment of the bushing of FIG. 8.
Figure 14:
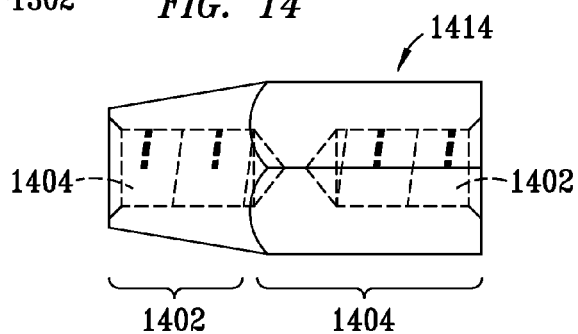
FIG. 14 is a side view of an alternative embodiment of the bushing of FIG. 9.

As shown in FIG. 3, the head of the screw 110 is configured for being operative via a flathead screwdriver. While not shown, the head of the screw 110 could be configured for any of a number of different types of drivers, such as, by way of example, but not limitation, a Phillips head screwdriver.

FIG. 6 exemplifies a bushing 614 as an alternative embodiment of the bushing 214 of FIGS. 2-5. The bushing 614 is similar to the bushing 214, but for being configured with a hexagonal, or other multi-sided, exterior, as shown in FIG. 7. The hexagonal exterior is adapted for being gripped by a tool such as a wrench or pliers for facilitating tightening or loosening of a stud 208 or screw 110.

FIG. 8 exemplifies a bushing 814 as an alternative embodiment of the bushing 214 of FIGS. 2-7. The bushing 814 is a hybrid of the bushings 214 and 614, wherein a portion 802 of the bushing defines a circular exterior similar to the bushing 214, and a portion 804 of the bushing defines a hexagonal exterior similar to the bushing 614.

FIG. 9 exemplifies a bushing 914 as an alternative embodiment of the bushing 814 of FIG. 8. The bushing 914 is similar to the bushing 814, having a portion 904 similar to the portion 804 of FIG. 8. The bushing 914 further includes a portion 902 which, unlike the portion 802 of the bushing 814, defines a generally frusto-conical section.

FIGS. 10-14 exemplify bushings 1014, 1114, 1314, and 1414 corresponding respectively to bushings 214, 614, 814, and 914 of FIGS. 5-9, but for each of bushings 1014, 1114, 1314, and 1414 further defining a stop (e.g., 1006, FIG. 10) proximate to the center between opposing threaded portions 1002 and 1004 of bushing 1014, between threaded portions 1102 and 1104 of bushing 1114, between threaded portions 1302 and 1304 of bushing 1314, and between threaded portions 1402 and 1404 of bushing 1414, to control how far a stud 208 or screw 110 in the threaded portions may be tightened against the bushing. Compared to the bushings 214, 614, 814, and 914, the bushing 1014, 1114, 1314, and 1414 facilitate greater tightening of a stud or screw without concern that the stud or screw may push the opposing screw or stud out of the bushing.

Particular dimensions of various components of the invention have not been discussed as they would be understood and/or could be determined by a person having ordinary skill the art. However, it is noted that, for manufacturing purposes, it may be desirable to include studs 208 in two or more lengths so that a user may select a size that is most suitable for his purposes. Alternatively, studs 208 could be provided in a single length constituting the longest length that it is anticipated that a user would need, and then cut to a desirable length. However, special skill would be required to cut a stud without damaging the threads.

In the operation of the embodiments of FIGS. 5-14, a threaded bushing 214, 614, 814, 914, 1014, 1114, 1314, or 1414 is secured to one end of the stud 208. A stud-and-bushing combination is screwed into each tapped screw receiver 104 of the junction box 102. A cover plate 108 is positioned over the junction box, and at least one screw is extended through each hole in the cover plate until it threadingly engages the threaded bushing, thereby securing the cover plate to the junction box.

As described in further detail below, FIGS. 15-38 represent alternative embodiments of the bushings of FIGS. 5-14. More specifically, the embodiments of FIGS. 15, 17, 19, 21, 23, 25, 27, and 29 are similar to the embodiments of FIGS. 5, 6, 8, 9, 10, 11, 13, and 14, respectively, but for further including at least one end configured for engaging a driving end of a screwdriver. The embodiments of FIGS. 31, 33, 35, and 37 are similar to the embodiments of FIGS. 15, 17, 19, and 21 respectively, but for one (female) end having threads which are internal, and a second (male) end having threads which are external.

In the discussion that follows, the driven end of the bushing configured for engaging the driving end of a screwdriver is depicted as a slot effective for receiving a flathead or flat blade screwdriver (not shown). However, it is understood that the driven end of the bushing configured for receiving the driving end of a screwdriver may be configured for receiving the driving end of any of a number of different types of screwdrivers, in addition to slotted types, such as external types (e.g., square, hexagon, 6-point sockets), cruciform types (e.g., Phillips, Frearson), and the like.

In furtherance of the foregoing, FIG. 15 exemplifies a bushing 1514 similar to bushing 214 (FIG. 5) defining a cylindrical exterior surface 1522 and internal (i.e., female) threads 1516 which extend generally through the length of the bushing. As shown in FIG. 16, bushing 1514 defines at a driven, or slotted, end 1526 slots 1602 for receiving the driving end of a flat head screwdriver (not shown). In operation, one end of stud 208 (FIGS. 2 and 4) is threadingly secured in an end of bushing 1514 opposing the slotted end 1526, and the other end of the stud is positioned for engaging the tapped screw receiver 104 of junction box 102. A screwdriver is then inserted into slots 1602 and torque is applied to turn stud 208 and start, but preferably not complete, securing the stud into tapped screw receiver 104 of junction box 102. The foregoing steps are repeated for each (typically one additional) tapped screw receiver of the junction box. Cover plate 108 is then positioned over the junction box, and at least one screw is extended through each hole in the cover plate until the at least one screw threadingly engages a respective threaded bushing. Torque is then applied to each screw until each screw and stud are firmly seated and the cover plate is secured to the junction box.

FIG. 17 exemplifies a bushing 1714 similar to bushing 1514 (FIG. 15), but for having a hexagonal exterior surface 1722 instead of cylindrical exterior surface 1522. Thread 1716 and slots 1802 of FIGS. 17 and 18 correspond respectively to threads 1516 and slots 1602 of FIGS. 15 and 16. Operation of bushing 1714 is virtually identical to operation of bushing 1514, but for the additional capability of being able to use a wrench, socket wrench, or the like, on hexagonal surface 1722 to apply torque to bushing 1714.

FIG. 19 exemplifies a bushing 1914 similar to bushing 1714 (FIG. 17), but for having an exterior surface comprising a first portion 1902 having a cylindrical surface 1922, and a second portion 1904 having a hexagonal exterior surface 1922. Thread 1916 and slots 2002 of FIGS. 19 and 20 correspond respectively to threads 1716 and slots 1802 of FIGS. 17 and 18. Operation of bushing 1914 is virtually identical to operation of bushing 1714.

FIG. 21 exemplifies a bushing 2114 similar to bushing 1914 (FIG. 19), but for having an exterior surface comprising a first portion 2102 having a frustoconical surface 2122, and a second portion 2104 having a hexagonal exterior surface 2122. Thread 2116 and slots 2202 of FIGS. 21 and 22 correspond respectively to threads 1916 and slots 2002 of FIGS. 19 and 20. Operation of bushing 2114 is virtually identical to operation of bushing 1914.

FIG. 23 exemplifies a bushing 2314 similar to bushing 1514 (FIG. 10) defining a cylindrical exterior surface 2322 and internal (i.e., female) threads 2312 and 2316 extending inwardly from respective opposing ends of the bushing toward a stop 2306 proximate to the center of bushing 2314. As shown in FIG. 24, bushing 2314 defines at a driven, or slotted, end 2326 slots 2402 for receiving the driving end of a flat head screwdriver (not shown). In operation, one end of stud 208 (FIGS. 2 and 4) is threadingly secured in threads 2312 until the stud abuts stop 2306, and the other end of the stud is positioned for engaging the tapped screw receiver 104 of junction box 102. A screwdriver is then inserted into slots 2402 and torque is applied to turn stud 208 and start, but preferably not complete, securing the stud into tapped screw receiver 104 of junction box 102. The foregoing steps are repeated for each (typically one additional) tapped screw receiver of the junction box. Cover plate 108 is then positioned over the junction box, and at least one screw is extended through each hole in the cover plate until the at least one screw threadingly engages a respective threaded bushing. Torque is then applied to each screw until each screw and stud are firmly seated and the cover plate is secured to the junction box.

FIG. 25 exemplifies a bushing 2514 similar to bushing 2314 (FIG. 23), but for having a hexagonal exterior surface 2522 instead of cylindrical exterior surface 2322. Threads 2512 and 2516, stop 2506, and slots 2602 of FIGS. 25 and 26 correspond respectively to threads 2312 and 2316, stop 2306, and slots 2402 of FIGS. 23 and 24. Operation of bushing 2514 is virtually identical to operation of bushing 2314, but for the additional capability of being able to use a wrench, socket wrench, or the like, on hexagonal surface 2522 to apply torque to bushing 2514.

FIG. 27 exemplifies a bushing 2714 similar to bushing 2514 (FIG. 25), but for having an exterior surface comprising a first portion 2702 having a cylindrical surface 2722, and a second portion 2704 having a hexagonal exterior surface 2722. Threads 2712 and 2716, stop 2706, and slots 2802 of FIGS. 27 and 28 correspond respectively to threads 2512 and 2516, stop 2506, and slots 2602 of FIGS. 25 and 26. Operation of bushing 2714 is virtually identical to operation of bushing 2514.

FIG. 29 exemplifies a bushing 2914 similar to bushing 2714 (FIG. 27), but for having an exterior surface comprising a first portion 2902 having a frustoconical surface 2922, and a second portion 2904 having a hexagonal exterior surface 2922. Threads 2912 and 2916, stop 2906, and slots 3002 of FIGS. 29 and 30 correspond respectively to threads 2712 and 2716, stop 2706, and slots 2802 of FIGS. 27 and 28. Operation of bushing 2914 is virtually identical to operation of bushing 2714.

FIG. 31 exemplifies a bushing 3114 similar to bushing 2314 (FIG. 23), defining a cylindrical exterior surface 3122, but instead of two internal (i.e., female) threads, bushing 3114 includes one internal (female) thread 3116 extending inwardly from one end of the bushing, and one external (male) thread 3120 integral with and extending outwardly from an opposing end of the bushing. As shown in FIG. 32, bushing 3114 defines at a driven, or slotted, end 3126 slots 3202 for receiving the driving end of a flat head screwdriver (not shown). In operation, the external thread 3120 is positioned for engaging the tapped screw receiver 104 of junction box 102. A screwdriver is then inserted into slots 3202 and torque is applied to turn external thread 3120 and start, but preferably not complete, securing the thread 3120 into tapped screw receiver 104 of junction box 102. The foregoing steps are repeated for each (typically one additional) tapped screw receiver of the junction box. Cover plate 108 is then positioned over the junction box, and at least one screw is extended through each hole in the cover plate until the at least one screw threadingly engages a respective threaded bushing. Torque is then applied to each screw until each screw and thread 3120 are firmly seated and the cover plate is secured to the junction box.

FIG. 33 exemplifies a bushing 3314 similar to bushing 3114 (FIG. 31), but for having a hexagonal exterior surface 3322 instead of cylindrical exterior surface 3122. Internal thread 3316 on driven end 3326, external thread 3320, and slots 3402 of FIGS. 33 and 34 correspond respectively to internal thread 3116 on driven end 3126, external thread 3120, and slots 3202 of FIGS. 31 and 32. Operation of bushing 3314 is virtually identical to operation of bushing 3114, but for the additional capability of being able to use a socket, wrench, or the like, on hexagonal surface 3322 to apply torque to bushing 3314.

FIG. 35 exemplifies a bushing 3514 similar to bushing 3314 (FIG. 33), but for having an exterior surface comprising a first portion 3502 having a cylindrical surface 3522, and a second portion 3504 having a hexagonal exterior surface 3524. Internal thread 3516 on driven end 3526, external thread 3520, and slots 3602 of FIGS. 35 and 36 correspond respectively to internal thread 3316 on driven end 3326, external thread 3320, and slots 3402 of FIGS. 33 and 34. Operation of bushing 3514 is virtually identical to operation of bushing 3314.

FIG. 37 exemplifies a bushing 3714 similar to bushing 3514 (FIG. 35), but for having an exterior surface comprising a first portion 3702 having a frustoconical surface 3722, and a second portion 3704 having a hexagonal exterior surface 3724. Internal thread 3716 on driven end 3726, external thread 3720, and slots 3802 of FIGS. 37 and 38 correspond respectively to internal thread 3516 on driven end 3526, external thread 3520, and slots 3602 of FIGS. 35 and 36. Operation of bushing 3714 is virtually identical to operation of bushing 3514.

It is understood that the present invention may take many forms and embodiments. Accordingly, several variations may be made in the foregoing without departing from the spirit or the scope of the invention. For example, the invention may have any of a number of different applications where a tapped screw receiver 104 may be recessed, such as on the interior or exterior of a building, where any form of facade 206 has created a space between the screw receiver and the desired depth for mounting signage, lighting fixtures, ceiling fans, aesthetic features, or the like. The recessed receiver is not limited to those on a junction box, but any hole designed and intended to receive a threaded stud.

In a further example, the invention may have application whenever a threaded rod is part of a linkage or an adjustable part on a vehicle, such as a large truck, some type of tractor implement, or the like, and the linkage or adjustable part is too short. This may occur, for example, when aftermarket, or "non OEM", products are purchased to replace something.

While maintaining the spirit and scope of the invention, in another application, the present invention may function as an expander bushing in industries where the depth or length of a control rod needs to be extended beyond its original design. By way of example, but not limitation, the invention could be used to extend a control rod on a driver's seat mounting bracket for a tractor or large commercial/industrial vehicle that is receiving a replacement seat or a replacement mounting bracket, but the design has been altered from the original manufacturer's design (e.g., because it was found defective or obsolete).

Still further, the present invention may be scaled to an appropriate load bearing size for any particular application.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for facilitating using at least one screw to secure a cover plate to a box; the box including at least one threaded tapped screw receiver positioned internally within the box and accessible via an open side of the box, the cover plate defining at least one hole corresponding to the at least one threaded tapped screw receiver, the apparatus comprising:

at least one threaded stud to engage the at least one threaded tapped screw receiver;

at least one bushing defining first and second opposed threaded portions extending inwardly from respective opposing ends of the bushing toward a stop proximate to the center of the bushing, the stop being to control how far the at least one stud and the at least one screw may be tightened against the bushing, the first threaded portion to receive one end of the at least one stud, the second threaded portion to receive the at least one screw extending through the at least one hole defined in the cover plate for securing the cover plate to the box; and a driven end of the bushing, the driven end being proximate the second threaded portion of the bushing and defining at least one slot to receive a driving end of a screwdriver.

2. The apparatus of claim 1 wherein the box is a junction box recessed in a wall.

3. The apparatus of claim 1 wherein the driven end of the bushing is to receive a driving end of a flat-head screwdriver.

4. The apparatus of claim 1 wherein the driven end of the bushing is to receive a driving end of a Phillips head screwdriver.

5. The apparatus of claim 1 wherein an exterior portion of the bushing defines a hexagonal surface.

6. The apparatus of claim 1 wherein an exterior portion of the bushing defines a conical surface.

7. The apparatus of claim 1 wherein at least a portion of the threads of the at least one stud are coated with lacquer.

8. The apparatus of claim 1 wherein:
  a first exterior portion of the bushing defines a hexagonal surface; and
  a second exterior portion of the bushing defines a conical surface.

9. A method for securing a receptacle cover plate to a box, the box including at least one threaded tapped screw receiver positioned internally within the box and accessible via an open side of the box, the cover plate defining at least one hole corresponding to the at least one threaded tapped screw receiver, the method comprising steps of:
  securing a first end of at least one threaded stud into a first threaded portion of at least one bushing defining a first threaded portion, a second threaded portion opposing the first threaded portion, the first and second opposed threaded portions extending inwardly from respective opposing ends of the bushing toward a stop proximate to the center of the bushing, the stop being to control how far the at least one stud and the at least one screw may be tightened against the bushing, and a driven end of the bushing proximate the second threaded portion, the driven end defining at least one slot for receiving a driving end of a screwdriver;
  engaging a second end of the at least one stud into the at least one threaded tapped screw receiver of the box;
  engaging the driven end of the bushing with the driving end of a screwdriver and applying torque through the screwdriver to secure the second end of the at least one stud into the at least one threaded tapped screw receiver of the box; and
  positioning the cover plate over the box; and extending at least one screw through the at least one hole in the cover plate and threadingly engaging the at least one screw with the second threaded portion of the at least one bushing, thereby securing the cover plate to the box.

10. The method of claim 9 wherein the box is a junction box recessed in a wall.

11. The method of claim 9 wherein an exterior portion of the bushing defines a hexagonal surface.

12. The method of claim 9 wherein an exterior portion of the bushing defines a conical surface.

13. The method of claim 9 wherein:
  a first exterior portion of the bushing defines a hexagonal surface; and
  a second exterior portion of the bushing defines a conical surface.

14. The method of claim 9 further comprising a step of coating at least a portion of the threads of the at least one stud with lacquer.

15. The method of claim 9 further comprising a step of coating at least a portion of the threads of the at least one stud with lacquer, and wherein:
  the bushing defines a stop in an interior portion of the bushing between ends of the bushing;
  a first exterior portion of the bushing defines a hexagonal surface; and
  a second exterior portion of the bushing defines a conical surface.

16. An apparatus for facilitating using at least one screw to secure a receptacle cover plate to a box, the box including at least one threaded tapped screw receiver positioned internally within the box and accessible via an open side of the box, the cover plate defining at least one hole corresponding to the at least one threaded tapped screw receiver, the apparatus comprising:
  at least one bushing defining a first end and a second end;
  wherein the first end includes external threads integral with and extending outwardly from the first end to engage the at least one threaded tapped screw receiver;
  wherein the second end includes internal threads extending inwardly from the second end of the bushing to receive the at least one screw extended through the at least one hole defined in the cover plate to secure the cover plate to the box;
  a stop defined in an interior portion of the at least one bushing between the external threads and the internal threads, the stop being to control how far the at least one screw may be tightened against the bushing; and
  wherein the second end defines at least one slot to receive a driving end of a screwdriver.

17. The apparatus of claim 16 wherein the box is a junction box recessed in a wall.

18. The apparatus of claim 16 wherein the second end is to receive a driving end of a flat-head screwdriver.

19. The apparatus of claim 16 wherein the second end is to receive a driving end of a Phillips head screwdriver.

20. The apparatus of claim 16 wherein an exterior portion of the bushing defines a hexagonal surface.

21. The apparatus of claim 16 wherein at least a portion of the external threads are coated with lacquer.

* * * * *